United States Patent [19]
Satoh

[11] Patent Number: 5,557,300
[45] Date of Patent: Sep. 17, 1996

[54] FUNCTIONAL DISPLAY APPARATUS

[75] Inventor: Kimiyasu Satoh, Kanagawa, Japan

[73] Assignee: Sony Corporation, Tokyo, Japan

[21] Appl. No.: 550,878

[22] Filed: Oct. 31, 1995

Related U.S. Application Data

[63] Continuation of Ser. No. 152,690, Nov. 16, 1993, abandoned.

[30] Foreign Application Priority Data

Nov. 17, 1992 [JP] Japan ..................... 4-331084

[51] Int. Cl.$^6$ ..................... G09G 5/00
[52] U.S. Cl. ................ 345/170; 345/168; 341/22; 340/815.56; 340/815.65
[58] Field of Search ................ 345/168, 170; 341/22; 340/815.56, 815.65; 379/368

[56] References Cited

U.S. PATENT DOCUMENTS

| | | | |
|---|---|---|---|
| 3,633,211 | 1/1972 | Batzdortt | 346/14 |
| 3,909,770 | 9/1975 | Oka | 340/815.56 |
| 4,092,640 | 5/1978 | Satoh | 345/170 |
| 4,364,112 | 12/1982 | Onodera | 364/200 |
| 5,034,602 | 7/1991 | Garcia | 345/170 |

FOREIGN PATENT DOCUMENTS 594299  1/1978  Switzerland .

OTHER PUBLICATIONS

Patent Abstract Of Japan vol. 10, No. 20 (E–376) 25 Jan. 1986 & JP-A-60 180 296 (Fujitsu) 14 Sep. 1985.

Patent Abstracts Of Japan vol. 3, No. 90 (E–127) 31 Jul. 1979 & JP-A-54 069 021 (ROCOH CO) 2 Jun. 1979.

Patent Abstracts Of Japan vol. 13, No. 496 (E–843) 9 Nov. 1989 & JP-A-01 198 838 (NEC CORP) 10 Aug. 1989.

*Primary Examiner*—Richard Hjerpe
*Assistant Examiner*—Kent Chang
*Attorney, Agent, or Firm*—William S. Frommer; Alvin Sinderbrand

[57] ABSTRACT

A display apparatus for use with a system for routing at least one type of signal between a desired source device and a desired destination device. The display apparatus includes a panel having a plurality of buttons mounted thereon. Each of the buttons respectively represents the type(s) of signal(s), the available source device(s) and the available destination device(s). The type(s) of signal(s) may be selected by a terminal device included in the system and the source and destination devices may be selected by activating the respective button. Each of the buttons contains a plurality of luminous elements each adapted to emit light of a respective color. As a result, the type(s) of signal(s), the source device(s) and the destination device(s) represented by the buttons and selected ones thereof may be readily identified.

31 Claims, 4 Drawing Sheets

FUNCTIONAL DISPLAY APPARATUS

This application is a continuation of application Ser. No. 08/152,690, filed Nov. 16, 1993, now abandoned.

BACKGROUND OF THE INVENTION

1. Field of the Invention

This invention relates to a functional display apparatus having a plurality of selectable buttons and, more particularly, to such apparatus for use with a control device or system having a routing switcher which enables functions or devices corresponding to the buttons to be readily identified.

2. Description of the Prior Art

In the prior art, a multi-source and multi-destination control unit having a routing switcher controls the routing of each of a plurality of signals, such as, a video signal, an audio signal, and a time code signal, from a source or input to a destination or output. Such control unit has a console panel containing a plurality of buttons which enables the desired routing to be selected.

More specifically, as illustrated in FIG. 6, the control unit has a front or console panel 100 containing a plurality of buttons which may be arranged in a plurality of groups. For example, the buttons may be arranged so as to form a source select group 200 containing 16 buttons arranged in two blocks each having 8 buttons, a destination select group 300 containing 16 buttons arranged in two blocks each having 8 buttons, and a signal select group 400 containing 6 buttons.

By selecting and depressing the buttons on the front panel 100, an operator may control the routing of different types of signals between a selected source and a selected destination. For example, suppose that a signal corresponding to button no. 3 in the signal select group 400 has been selected and that the button labelled no. 1 in the source select group 200 and the button labelled no. 2 in the destination select group 300 have been depressed. In this example, the signal corresponding to button no. 3 in the signal group 400 is routed between the source corresponding to button no. 1 in the source group 200 and the destination corresponding to button no. 2 in the destination group 300.

Typically, the buttons contained on the front panel 100 are provided with a reference indication, such as the reference numerals shown in FIG. 6, which are affixed to the buttons by means of silk screening or similar such process. Such means of identification may cause difficulties in operating the control unit. For example, buttons having only standard silk screened numerals affixed thereto cannot provide a means for readily distinguishing between the selected and the non-selected buttons. As a result, an operator may be required to attach labels to the selected buttons so as to provide a means for readily identifying such selected buttons. Further, proper selection of the buttons may be difficult, if not impossible, when the front panel 100 is situated in a relatively dark location. Furthermore, when the control unit is used with a plurality of controllers, it may be difficult to distinguish between selections or functions associated with each of the controllers. If it is difficult to distinguish between the selected buttons or the functions represented thereby in, for example, the latter situation, then multiple units may be necessary. As is to be appreciated, such use of multiple units results in increased costs.

Thus, the prior art has failed to provide a front or console panel for a control unit having a plurality of buttons which enables the functions or sources, destinations and types of signals represented by the buttons to be readily identified and which enables selected buttons or functions to be readily identified and/or distinguished from non-selected buttons or functions.

OBJECTS AND SUMMARY OF THE INVENTION

An object of the present invention is to provide a functional display apparatus which overcomes the problems associated with the prior art.

More specifically, it is an object of the present invention to provide a functional display apparatus having a plurality of buttons for use with a control unit or system in which functions or source devices, destination devices and types of signals represented by the buttons are readily distinguishable from each other.

Another object of the present invention is to provide a functional display apparatus as aforesaid in which, upon the selection of a function or source device, destination device and type of signal or upon the depression of a button(s), the button(s) corresponding thereto is readily identified from the other remaining button or buttons.

In accordance with an aspect of the present invention, a functional display apparatus for use with a controller is provided. The apparatus comprises a panel and a plurality of buttons mounted in the panel. Each of the buttons represents a respective function operable by the controller and selectable by depressing the respective button. Each of the buttons contains a plurality of luminous elements which are each adapted to light in a respective color so as to distinguish between the functions represented by the buttons.

Other objects, features and advantages according to the present invention will become apparent from the following detailed description of the illustrated embodiment when read in conjunction with the accompanying drawings in which corresponding components are identified by the same reference numerals.

DETAILED DESCRIPTION OF THE PREFERRED EMBODIMENT

Figure 1:
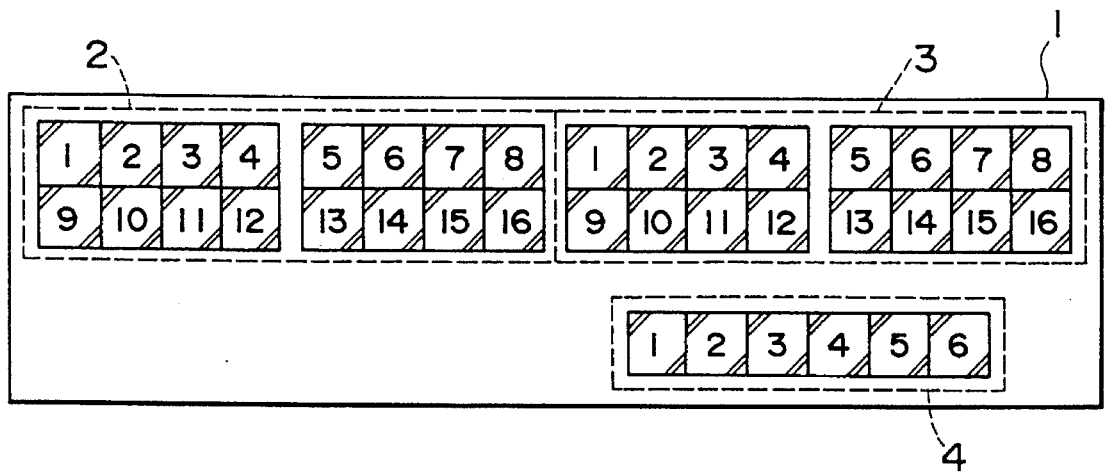
FIG. 1 is a front view of a functional display apparatus according to an embodiment of the present invention which illustrates an initial lighting state thereof.

FIG. 1 illustrates a front view of a functional display panel or console i of a display controller for a multi-source and multi-destination control unit or system in accordance with the embodiment of the present invention. The control unit may have a routing switcher device or devices which may control the routing of each of a plurality of signals, such as, video, audio and time code signals, from a source to a destination. A more detailed description of such control unit will be presented hereinafter.

Figure 6:
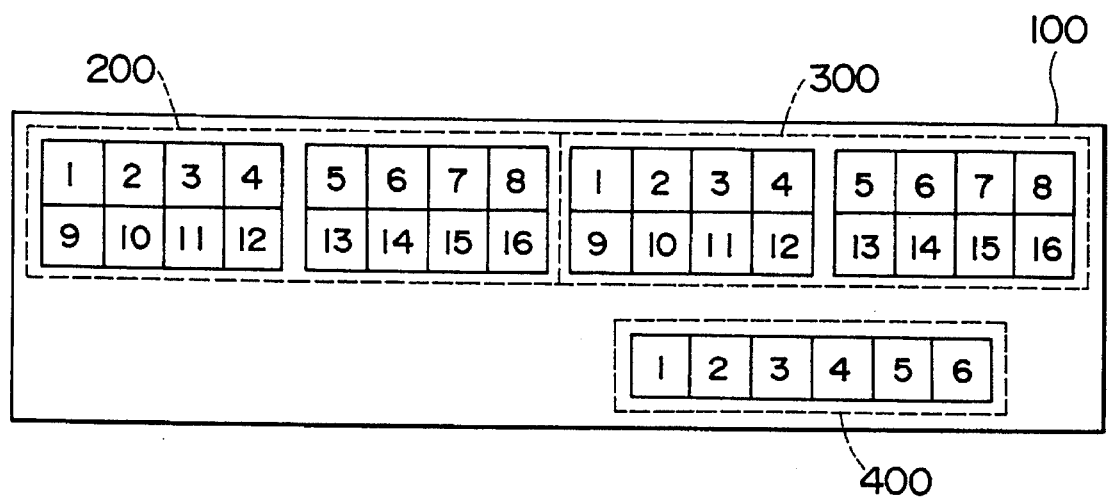
FIG. 6 is a front view of a display apparatus according to the prior art.

As shown in FIG. 1, the panel 1, like the panel 100 of FIG. 6, contains a plurality of push button switches arranged as selector buttons in a plurality of groups. That is, the buttons are arranged so as to form a source select group 2 containing 16 buttons arranged in two blocks each having 8 buttons, a destination select group 3 containing 16 buttons arranged in two blocks each having 8 buttons, and a signal select group 4 containing 6 buttons. Depressing buttons in the panel 1 causes a selected signal to be routed in a manner as hereinafter more fully described. Unlike the buttons in the panel 100 of FIG. 6, the buttons of the present invention are adapted to light in selected colors and in a relatively dim state so as to identify the functions or devices corresponding to the buttons, and are further adapted to light in a relatively bright state so as to identify the selected button(s) or function(s).

More specifically, each of the buttons in the panel 1 of FIG. 1 is constructed so as to contain a plurality of luminous elements therein, such as, light emitting diodes (LED's), each of which is adapted to emit a light of a respective color. In the preferred embodiment, each button contains two LED's, one of which emits green light and the other emits amber light. Further, each LED is preferably coupled to a switching circuit, as hereinafter more fully described, which is adapted to cause: (i) one of the LED's contained within each button to light in the relatively dim state when power is applied to the display panel of the display controller, (ii) one of the LED's contained within a button to light in the relatively bright state when the respective button is depressed, and (iii) one of the LED's in one or more of the buttons to light in the relatively bright state when the control unit is operating in a so-called breakaway mode.

The groups of buttons in the panel 1 of FIG. 1 are assigned respective colors. For example, the source group 2 and the destination group 3 may be respectively assigned green and amber. Accordingly, when power is applied to the display apparatus, only the green LED's contained within the buttons of the source group 2 and the amber LED's contained within the buttons of the destination group 3 light in the relatively dim state, as illustrated in FIG. 1.

Figure 2:
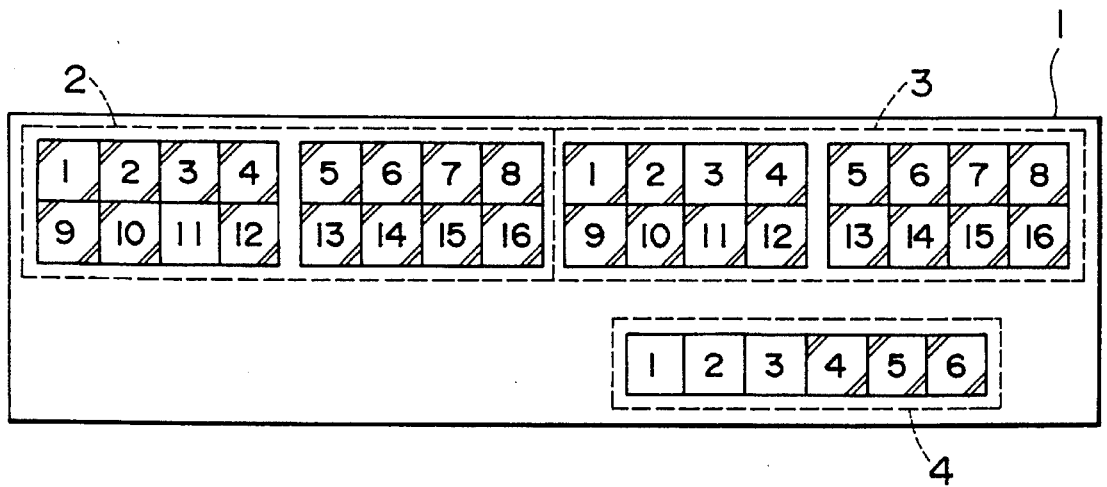
FIG. 2 is a front view of the functional display apparatus of FIG. 1 illustrating a selection of buttons to which reference will be made in explaining the operation of the present apparatus.
Figure 3:
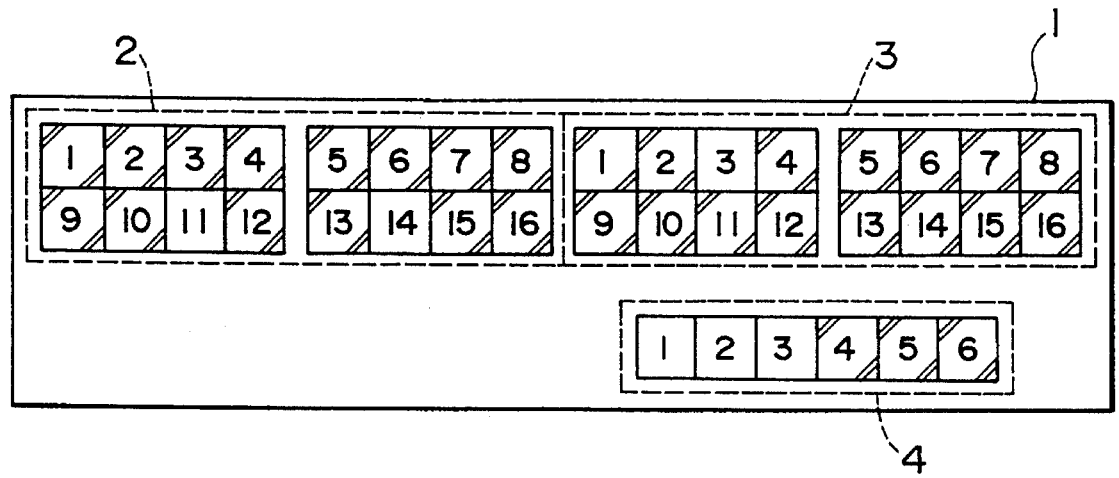
FIG. 3 is a front view of the functional display apparatus of FIG. 1 illustrating a selection of buttons to which reference will be made in explaining the operation of a breakaway mode.

In FIGS. 1–3, the buttons having a plurality of cross lines therethrough represent buttons in the dim state and buttons without such cross lines represent buttons in the bright state.

All of the buttons in the panel 1 are preferably fabricated from a light colored translucent material, such as a white translucent material, or similar Such material. As a result, light emitted from the LED(s) contained within the buttons cause the buttons to be "lit" in the respective color and state (i.e., either dim or bright).

Thus, upon applying power to the display panel 1 of the display apparatus, all of the buttons in the source group 2 are lit dim green and all of the buttons in the destination group 3 are lit dim amber. As a result, an operator is easily able to identify the source and the destination groups of buttons.

When a button or buttons in either the source group 2 or the destination group 3 are selected by depressing the respective button, the respective LED having the assigned color in the depressed button(s) is caused to light in the bright state, thereby causing the depressed button(s) to be brightly lit. As a result, an operator is easily able to identify the selected button(s) so as to readily identify the respective source or destination.

The buttons in the signal select group 4 are initially assigned the color green. That is, in a manner similar to that of the source group 2 and the destination group 3, upon applying power to the display panel 1, the buttons in the signal select group 4 are lit dim green. Further, upon selecting a type or types of signals in a manner as hereinafter more fully described, the green LED contained within the button(s) corresponding thereto is caused to light in the bright state, thereby causing these button(s) to be lit bright green. As a result, the operator is readily able to identify the signal select group 4 and a selected type or types of signals.

The aforementioned multi-source and multi-destination control unit or system will now be described with reference to FIG. 5. As shown therein, this system generally includes a control terminal 11; a plurality of routing switchers 12–15, 21 and 22; a plurality of output devices 17a–17p; a plurality of input devices 18a–18p; and a control area 20 having a plurality of remote controllers 16A1–16A2, 16B1–16Bm, and 16C1–16Co each, in turn, having a respective display panel 1.

More specifically, the control terminal 11, which may include a conventional type computer with a keyboard and display, is coupled to the routing switcher 12 by way of a bus 19. The routing switcher 12, in turn, is coupled to each of the other routing switchers 13–15, 21 and 22, the output devices 17a–17p, the input devices 18a–18p, and the remote controllers 16 in the control area 20. The control terminal is adapted to receive commands from an operator and, in accordance therewith, to supply a control signal(s) to the appropriate one or ones of the switchers and remote controllers so as to activate the same or to cause a desired operation to be performed thereat. For example, these control signals may be utilized to select one or more of the routing switchers, and to select which of the luminous elements contained within each button in each of the panels 1 is lit when power is applied, a button is depressed and the system is operating in the breakaway mode.

Each of the output devices 17a–17p, which may, for example, include a video camera or a reproducing-type device such as a video tape recorder/reproducer (VTR), is adapted to receive a control signal from the routing switcher 12 and, in response thereto, to be activated so as to supply or transmit therefrom one of a plurality of different signals, such as video signals, audio signals and time code signals, to the selected routing switcher. Each of the output devices is further adapted to supply a signal, such as a status signal, a verification signal and so forth; to the routing switcher 12 for supply therefrom to the appropriate destination, such as the control terminal 11.

Each of the input devices 18a–18p, which may, for example, include a monitor device or a recording-type device such as a VTR, is adapted to receive a control signal from the routing switcher 12 and, in response thereto, to be activated so as to receive a signal from the selected one of the routing switchers 12–15, 21 and 22. The signal supplied from the selected routing switcher had been supplied thereto from a selected one of the output devices 17a–17p. As with the output devices 17a–17p, each of the input devices 18a–18p is further adapted to supply a signal, such as a status signal, a verification signal and so forth, to the routing switcher 12 for supply therefrom to the appropriate destination, such as the control terminal 11.

As previously described, the routing switcher 12 is coupled to the control terminal 11; to each of the remote controllers 16 in the control area 20; to each of the routing switchers 13–15, 21 and 22; to the output devices 17a–17p;

and to the input devices 18a–18p. Each of the routing switchers 13–15, 21 and 22 is coupled to each of the output devices 17a–7p and the input devices 18a–18p. Although in FIG. 5, in the interest of clarity, connections are only shown between the output device 17a and the routing switchers and the input device 18a and the routing switchers, similar such connections exist between each of the output devices and input devices and the switchers.

Each of the routing switchers 12–15, 21 and 22 is adapted, upon receipt of a control signal supplied from the control terminal 11 as previously described or when in the breakaway mode as hereinafter more fully described, to be activated so as to be able to receive a respective type of signal from a selected one of the output devices 17a–7p and to supply the same to a selected one of the input devices 18a–18p. That is, as previously described, each of the output devices 17a–17p supplies therefrom a plurality of different types of signals (such as video, audio and time code signals). Each of these signals is supplied to a respective one of the routing switchers. For example, routing switchers 12–14 may be respectively designated video, audio and time code routing switchers and, as such, only receive video, audio and time code signals, respectively.

As previously described, the control area 20 includes a plurality of remote controllers 16 each having a respective panel 1. Each of these remote controllers may be located in a different location or room within a facility or studio. Each of the remote controllers 16 is coupled to the routing switcher 12 by way of the bus 19 and from there to the control terminal 11, the output devices 17a–17p, the input devices 18a–18p, and the switchers 13–15, 21 and 22. In the preferred embodiment, each of the remote controllers 16 is commonly connected.

Each of the remote controllers 16 is adapted to receive control signals from the control terminal 11 and, in response thereto, to operate in a desired manner. For example, each of the controllers 16 may receive control signals for controlling which luminous element in each button in each of the panels 1 is to be lit when power is applied, when the respective button is depressed, and when the system is in the breakaway mode, in the manner previously described. In this example, upon receipt of such control signals, the remote controllers cause the appropriate luminous element in each button in each panel 1 to be lit in each situation.

Each of the controllers 16 is further adapted to supply control signals therefrom to selected one or ones of the output devices 17a–7p and the input devices 18a–18p so as to activate the same by way of the bus 19 and the switcher 12 in response to the depression of an activation button or buttons located on the panels 1 (not shown) by an operator. Since each of the remote controllers 16 is commonly connected as previously described, the operator may select the desired output and input devices by depressing the corresponding activation buttons on any panel 1 of any remote controller 16. Alternatively, such activation of the input and output devices can be controlled from the control terminal 11 or by use of activation buttons located on the input and output devices.

The sixteen output devices 17a–17p, the sixteen input devices 18a–18p, and the six routing switchers 12–15, 21 and 22 respectively correspond to the sixteen buttons in the source group 2, the sixteen buttons in the destination group 3, and the six buttons in the signal select group 4 of FIGS. 1–3. As is to be appreciated, the present invention is not limited to a panel having such three groups of buttons each having these respective numbers of buttons contained therein, but can instead be applied to a panel having any number of groups each having any number of buttons.

In the above-described system, two modes of operation may be employed, that is, a regular or normal mode and the so-called breakaway mode. In the normal mode and in the preferred embodiment, only one of the output devices 17a–7p and one of the input devices 18a–18p may be selected at any one time. However, in such normal mode, one or more than one of the routing switchers 12–15, 21 and 22 may be selected. As an example, video and audio signals from a selected output device, such as the input device 17a, may be respectively supplied through the routing switchers 12 and 13 to a selected input device, such as the input device 18a.

On the other hand, in the breakaway mode, one of the input devices 18a–18p is selected and, for each of the routing switchers which was previously selected, one of the output devices 17a–7p may be selected. More specifically, in such breakaway mode, the routing switcher(s) to be utilized are preferably those which had been previously selected as, for example, when the system was operating in the normal mode, by use of the control terminal 11. Such breakaway mode is activated by depressing any desired button in the signal select group 4 of any panel 1 which had been previously selected by the control terminal 11 and accordingly was lit bright green. Upon activating the breakaway mode, the button depressed in the signal select group 4 remains lit bright green and the other buttons previously selected by the control terminal 11 in the signal select group 4, if any, are caused to change from a bright green state to a bright amber state, so as to provide an indication that the system is operating in the breakaway mode and which switcher is currently selected. A desired one of the output devices 17a–7p for the currently selected switcher is selected by depressing the corresponding button in the source group 2, whereupon the depressed button is lit bright green and all other previously selected buttons in the source group 2, if any, are caused to be lit bright amber. In the preferred embodiment, only one of the input devices 18a–18p may be utilized and such input device is preferably the input device previously selected when the system was operating in the normal mode. However, the present invention is not so limited, and another input device may be selected. Afterwards, the next desired previously selected switcher is similarly selected by depressing the corresponding now brightly lit amber button in the signal select group 4, and the desired output device is also similarly selected by depressing the button corresponding thereto. Such selection process continues for each selected switcher and output device.

The operation of the above-described system will now be described.

The operator may initially select the colors in which the buttons are to be lit when power is applied and the button(s) are depressed by use of the control terminal 11. As a result, corresponding control signals are supplied through the bus 19 and the switcher 12 to the remote controllers 16, whereupon the appropriate luminous element(s) are caused to be lit in each panel 1 in the manner previously described. The operator may then select one or more of the routing switchers 12–15, 21 and 22, whereupon control signals are supplied through the bus 19 and the switcher 12 to the selected switcher(s) so as to activate the same. In this latter situation, control signals indicating the selected switcher(s) are supplied to the remote controllers 16, whereupon the buttons corresponding thereto are caused to be lit bright green in each of the panels I in the manner previously described.

In the normal mode, the operator may select one of the output devices 17a–7p and one of the input devices 18a–18p by depressing the buttons corresponding thereto on any panel 1 of the remote controllers 16, whereupon each of the respective buttons in each of the panels are caused to be brightly lit in the appropriate respective color and control signals are supplied therefrom to the switcher 12 by way of the bus 19 and from there to the selected switcher. Upon receipt of such control signals, the desired output and input devices are selected. Activation of the selected input and output devices is accompanied in the manner previously described. As a result, the selected type(s) of signals from the selected output device are supplied through the selected switcher(s) to the selected input device.

In the breakaway mode, the operator depresses a desired one of the previously selected buttons in the signal select group 4, whereupon the selected button remains lit bright green and a previously selected button(s), if any, in the signal select group is caused to change from a bright green state to a bright amber state, and depresses the button corresponding to a desired output device, whereupon the depressed button is lit bright green and all other selected buttons therein, if any, are lit bright amber. Such process is continued for each of the previously selected switchers in the manner previously described. Since all of the panels 1 are connected together as previously mentioned, upon depressing a button on any of the panels causes the corresponding light to be lit on each of the panels.

As an example, suppose when operating in the normal mode, switchers 12 and 13 and input device 18a were being utilized, and now it is desired to operate in the breakaway mode in which video signals from the output device 17a and audio signals the output device 17b are to be supplied to the input device 18a. In this example, the operator depresses one of the buttons corresponding to either of the switchers 12 or 13, whereupon the depressed button remains lit bright green and the button corresponding to the other of the switchers 12 and 13 is lit bright amber, and depresses the button corresponding to the respective one of the output devices 17a and 17b. The operator then performs a similar operation with the other of the switchers 12 and 13. As a result, the video signals from the output device 17a and the audio signals from the output device 17b are respectively supplied through the switchers 12 and 13 to the input device 18a.

To confirm the source for each signal in the breakaway mode, the previously selected buttons in the signal select group 4 are respectively depressed, whereupon the respective depressed button in the signal select group 4 and the corresponding button in the source group 2 are caused to be lit bright green and all other previously selected buttons in the signal select and source groups are caused to be lit bright amber.

Further examples of the above-described operating mode and breakaway mode as applied to each of the panels 1 in the system of FIG. 5 will now be described.

As previously mentioned, FIG. 1 illustrates the control panel 1 when power is applied thereto and when no buttons or functions have been selected. That is, in this condition, all of the buttons in the source group 2 and the signal select group 4 are lit dim green and all of the buttons in the destination group 3 are lit dim amber.

FIG. 2 illustrates a situation in which switchers corresponding to button nos. 1, 2 and 3 of the signal select group 4, that is, switchers 12, 13 and 14, were selected by the control terminal 11. Further, in FIG. 2 the output device corresponding to button no. 11 in the source group 2 and the input device corresponding to button no. 3 in the destination group 3, that is, output device 17k and input device 18c, respectively, have been selected by depressing the corresponding buttons. As is to be appreciated, such button selection is made after power has been supplied to the panel 1. As a result, in the source group 2, only button no. 11 is lit bright green and the other buttons in this group remain lit dim green; in the destination group 3, only button no. 3 is lit bright amber and the other buttons in this group remain lit dim amber; and in the signal select group 4, only buttons nos. 1, 2 and 3 are lit bright green and the other buttons in this group remain lit dim green.

FIG. 3 illustrates a situation in which the control system is operating in the breakaway mode. In this situation, switchers corresponding to buttons nos. 1, 2 and 3 of the signal group 4, that is, switchers 12, 13 and 14, respectively, have been previously selected by the control terminal 11. Further, it was desired to respectively connect the output devices corresponding to button nos. 11, 14 and 16 in the source group 2, that is, output devices 17k, 17n and 17p, respectively, to the switchers 12, 13 and 14, and from there to the input device corresponding to button no. 3 in the destination group 3, that is, the input device 18c. Accordingly, button no. 3 has been selected in the destination group 3; and buttons nos. 1, 2 and 3 of the signal select group 4 have been respectively selected with the corresponding buttons nos. 11, 14 and 16 of the source group 2 in a manner similar to that previously described.

In the breakaway situation illustrated in FIG. 3, button no. 3 in the destination group 3 is lit bright amber, while the other buttons contained therein remain lit dim amber. Further, the buttons "selected" or depressed in the signal group 4 and the buttons selected in the source group 2 are lit either bright green or bright amber depending on whether the respective signal group button and its corresponding source group button were the most recently depressed. That is, the most recently depressed button in the signal select group 4 and the source group 2 are lit bright green, while the previously depressed or selected buttons in these groups are lit bright amber and all of the non-selected buttons in these groups are lit dim green.

As an example, suppose that, in the above situation, button no. 1 in the signal group 4 and button no. 11 in the source group 2 were the most recently selected buttons in these two groups. In this example, button no. 1 in the signal group 4 and button no. 11 in the source group 2 are lit bright green, while buttons nos. 2 and 3 of the signal group 4 and buttons nos. 14 and 16 of the source group 2 are lit bright amber and all of the non-selected buttons in these groups are lit dim green.

Such lighting in the source group 2 and the signal group 4, as previously mentioned, provides an indication that the control system is operating in the breakaway mode.

As previously described, to confirm a source or output device for a switcher or type of signal when in the breakaway mode, an operator merely depresses the button in the signal group 4 corresponding to the respective switcher for which the output device is to be confirmed, whereupon the depressed button in the signal group and the corresponding button in the source group are lit bright green and the other previously selected buttons in these groups are lit bright amber. Thus, the switcher (type of signal) and its output device (source) may be readily confirmed. Such confirmation may be performed for each switcher (type of signal) by depressing the buttons in the signal group 4 in a sequential manner.

As an example, suppose, when in the previously described breakaway mode situation of FIG. 3, it is desired to confirm the output device (source) of the switcher (type of signal) corresponding to button no. 2 in the signal group 4. In this example, the operator depresses button no. 2 in the signal group 4, whereupon the light emitted from this button changes from bright amber to bright green and, in the source group 2, the light emitted from button no. 11 changes from bright green to bright amber and button no. 14 changes from bright amber to bright green. The other buttons remain unchanged. Thus, only the signal and its source (i.e., button no. 2 in group 4 and button no. 14 in group 2, respectively) are lit bright green, thereby enabling easy confirmation thereof.

Figure 4:
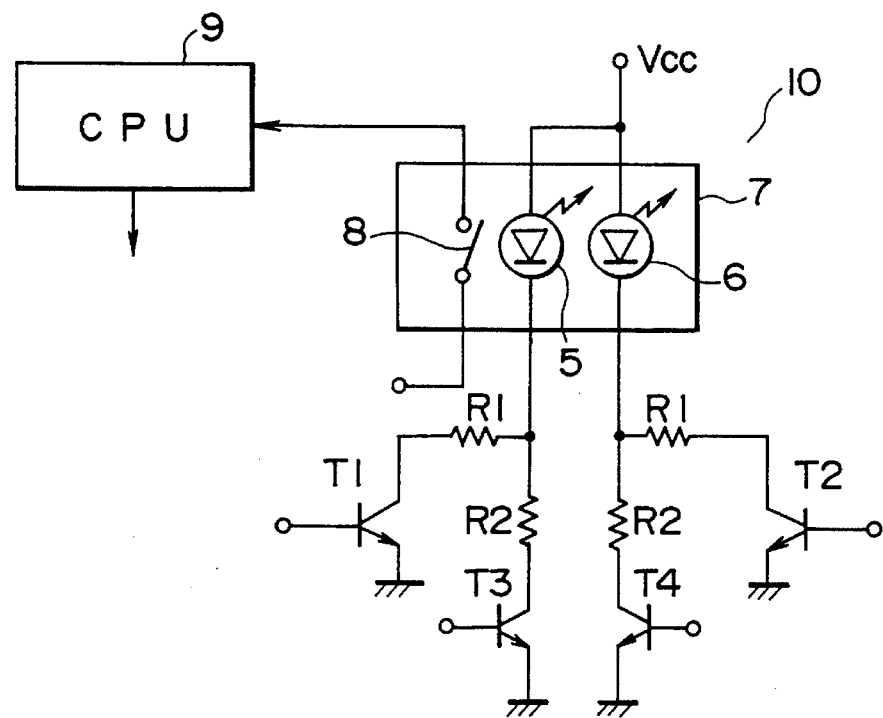
FIG. 4 is a circuit diagram for controlling the lighting of the buttons in the apparatus of FIG. 1.
Figure 5:
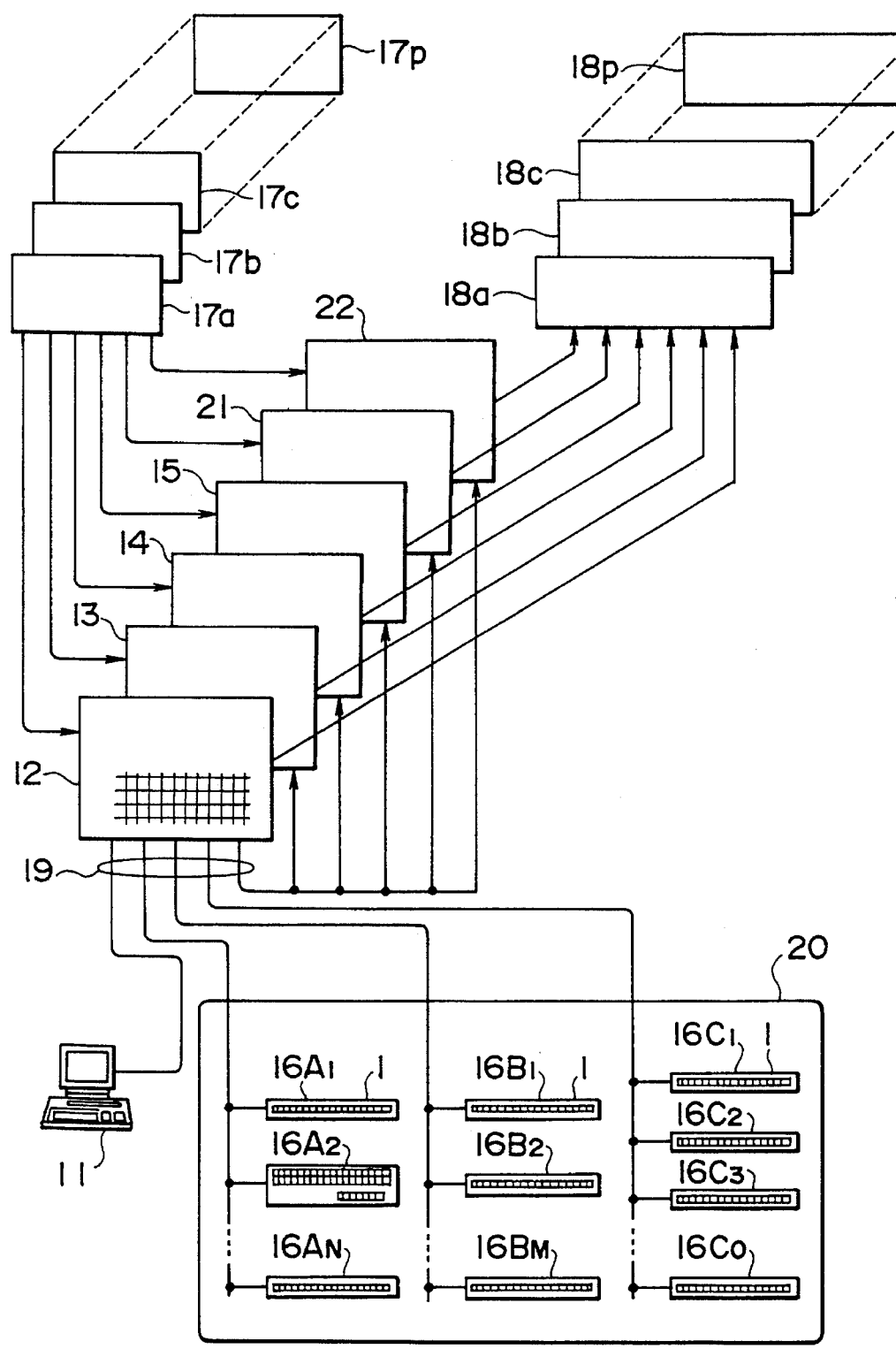
FIG. 5 illustrates a system utilizing the apparatus of FIG. 1.

FIG. 4 illustrates a lighting control circuit 10 which may be utilized for controlling the lighting of each of the buttons on any one of the panels 1 in any of the controllers 16 in the system of FIG. 5. More specifically, the control circuit 10 generally includes a push-button switch 7 having a manual switch 8, LED's 5 and 6, switching transistors T1, T2, T3 and T4, and a control circuit 9.

As shown in FIG. 4, the collectors of the transistors T1 and T3 are respectively coupled through resistors R1 and R2 to the LED 5 which, in turn, is coupled to a voltage or power source (not shown). Similarly, the collectors of transistors T2 and T4 are respectively coupled through resistors R1 and R2 to the LED 6 which, in turn, is coupled to the voltage or power source. The emitters from transistors T1, T2, T3 and T4 are connected to ground. The control circuit 9, which includes a CPU, is coupled to the base of each of the transistors (not shown), to the control terminal 11 (not shown), and to the manual switch 8, which may be a tactile switch.

LED's 5 and 6 are respectively adapted to emit green and amber light. Transistors T1 and T3 are respectively adapted to cause the LED 5 to light in a relatively bright and dim state. Similarly, transistors T2 and T4 are respectively adapted to cause the LED 6 to light in a relatively bright and dim state. Resistors R1 and R2, which preferably have resistance values such that R1<R2, are adapted to limit collector currents supplied to the LED's 5 and 6. The control circuit 9 is adapted to receive a control signal from the control terminal 11 and, in response thereto, to supply control signals to the base of one or more of the transistors so as to turn on or off the respective transistor(s).

The designated color of each respective button is controlled by the control circuit 9. That is, in response to an input or control signal from the control terminal 11, the circuit 9 supplies a control signal to the base(s) of the transistor(s) so as to enable only the transistor(s) coupled to the appropriate LED to be turned on, thereby allowing only the appropriate LED to be lit.

Alternatively, the control circuit 9 may be included in the control terminal 11 (FIG. 5). In this situation, control signals are supplied from the control terminal 11 to the appropriate component or components in each of the control circuits 10.

Upon applying voltage to the circuit 10, as when power first is turned on, the one of the transistors T3 or T4 which was enabled by the control signal from the control circuit 9 is turned on, thereby causing the corresponding one of the LED's 5 and 6 to emit light in a dim state. When the button is depressed, that is, when the switch 8 is turned-on or closed, the control circuit 9 supplies a signal to the base of the appropriate one of the transistors T1 or T2 so as to turn on the appropriate transistor, thereby causing the corresponding LED to light in the bright state. Simultaneously therewith, the control circuit 9 may supply a signal to the base of the one of the transistors T3 or T4 which had been previously turned on so as to turn this transistor off.

The control circuit 9 is further adapted to control the color of each button when the control system is operating in the breakaway mode in response to a control signal received from the control terminal 11.

Thus, in accordance with the present invention, the buttons on each panel 1 of each controller 16 in the system of FIG. 5 are caused to be lit in different colors and in different states, as previously described, so as to distinguish between functions and selections. As is to be appreciated, such lighting of the buttons in this manner enables the operator to readily identify buttons or functions or devices when the panel is in an initial state, to readily identify selected buttons or functions or devices, and to readily confirm the selection of desired buttons or functions or devices even when the panel 1 is located in a relatively dark place. Further, by having the controllers 16 connected together as previously described, each selected function or button is readily visible to an operator at any controller.

Although in describing the above embodiment of the present invention, each button on each panel 1 contained two different colored LED's, in particular, a green colored LED and an amber colored LED, the present invention is not so limited. That is, each button may contain a different number of LED's, or similar such devices, and may emit different color light.

Further, the present invention is not limited to the arrangement of buttons in the panel 1 specifically illustrated in FIGS. 1–3, but may instead be applied to any arrangement of buttons. That is, the present invention may be applied to a panel, or similar such device, which has any number of groups of buttons each containing any respective number of buttons.

Furthermore, the present invention is not limited to using the specific selection of colors for each of the groups of buttons contained in each panel 1. Instead different colors may be selected for these groups.

Further, although the buttons in the panel 1 were described as being of the push-button type, other types of buttons may be utilized.

Additionally, although in the above-described embodiment, only one of the two LED's may be lit at a time, the present invention is not so limited. That is, two or more of the LED's contained within each button may be caused to light simultaneously so as to increase the number of functions or selections which may be identified.

Furthermore, although in the above-described breakaway mode, different sources could be respectively selected for different signals, the present invention is not limited to these specific groups. Instead, other groups of buttons could be utilized in a similar manner.

Although a preferred embodiment of the present invention and modifications thereof have been described in detail herein, it is to be understood that this invention is not limited to this precise embodiment and modifications, and that other modifications and variations may be affected by one skilled in the art without departing from the spirit and scope of the invention as defined by the appended claims.

What is claimed is:

1. A functional display apparatus for a controller, said apparatus comprising:

a panel;

a plurality of selector buttons mounted in said panel, each of said buttons representing a respective function operable by said controller and selectable by manually activating the respective button, each of said buttons being fabricated from a translucent-type material and containing a plurality of luminous elements each adapted to emit light in a respective color so as to distinguish between the functions represented by said buttons and each of said luminous elements further adapted to emit light in a relatively dim state and a relatively bright state;

means for automatically causing one of said luminous elements in each of said buttons to emit light in said dim state upon applying power to said functional display apparatus; and means responsive to the activation of a button for causing one of said luminous elements contained in the respective button to emit light in said bright state so as to readily identify the activated button.

2. A functional display apparatus as in claim 1, wherein said buttons are arranged in a plurality of groups, each of said groups having a plurality of buttons and each representing a respective type of function.

3. A functional display apparatus as in claim 2, wherein, for each button in a group, the luminous element which is adapted to emit light in a selected color is lit in said dim state upon applying said power so as to readily identify the buttons associated with each type of function.

4. A functional display apparatus as in claim 1, wherein each of said luminous elements is a light emitting diode.

5. A functional display apparatus as in claim 1, further comprising a plurality of switching transistors.

6. A functional display apparatus as in claim 6, wherein each of said luminous elements is coupled to two of said switching transistors.

7. A functional display apparatus as in claim 6, wherein one of the two switching transistors coupled to each of said luminous elements is adapted to cause the respective element to emit light in said relatively dim state and the other of the two switching transistors coupled to each of said luminous elements is adapted to cause the respective element to emit light in said relatively bright state.

8. A functional display apparatus as in claim 7 further comprising means for receiving power and wherein each of the transistors coupled to each of said luminous elements adapted to cause the respective element to emit light in said dim state causes said respective element to emit light in said dim state upon applying said power.

9. A functional display apparatus as in claim 7, wherein each of the transistors coupled to each of said luminous elements adapted to cause the respective element to emit light in said relatively bright state causes said respective element to emit light in said bright state upon activating the respective button.

10. A functional display apparatus as in claim 7, further comprising control means for controlling said plurality of switching transistors.

11. A functional display apparatus as in claim 1, further comprising first and second switching means for respectively causing each of said luminous elements to emit light in said relatively dim state and said relatively bright state.

12. A functional display apparatus as in claim 11, wherein each of said first and second switching means includes a plurality of switching transistors.

13. A functional display apparatus as in claim 11, further comprising control means for controlling said first and second switching means.

14. A system for selectively routing signals, said system comprising:

a plurality of selectable output devices each adapted to transmit a plurality of respective signals therefrom;

a plurality of selectable input devices for receiving signals;

a plurality of selectable routing switching means each receiving a respective transmitted signal from a selected one of said output devices and for routing the received transmitted signal to a selected one of said input devices;

means for selecting at least one of said plurality of routing switching means so as to receive the respective transmitted signal from the selected output device and supply the same to the selected input device; and at least one display apparatus having a panel with a plurality of selector buttons fabricated from a translucent-type material mounted thereon, each of said buttons respectively representing one of said routing switching means, said input devices and said output devices and containing a plurality of luminous elements each adapted to emit light in a respective color so as to distinguish between said switching means, said input devices and said output devices, each of said luminous elements further adapted to emit light in a relatively dim state and a relatively bright state, each of said input devices and said output devices being selectable by manually activating the respective button corresponding thereto, each said display apparatus includes means for automatically causing one of said luminous elements in each of the respective buttons to emit light in said dim state upon applying power to the respective display apparatus and means responsive to the activation of a button for causing one of said luminous elements contained in the respective button to emit light in said bright state so as to readily identify the activated button.

15. A system for selectively routing signals as in claim 14, wherein at least one of said output devices is a reproducing device.

16. A system for selectively routing signals as in claim 14, wherein at least one of said output devices is a video camera.

17. A system for selectively routing signals as in claim 14, wherein at least one of said input devices is a recording device.

18. A system for selectively routing signals as in claim 14, wherein at least one of said input devices is a monitor.

19. A system for selectively routing signals as in claim 17, wherein said buttons in each said panel are arranged in a plurality of groups, each of said groups having a plurality of buttons and each representing one of said plurality of routing switching means, said plurality of input devices and said plurality of output devices.

20. A system for selectively routing signals as in claim 19, further comprising means for respectively selecting one of the luminous elements contained within each of said buttons.

21. A system for selectively routing signals as in claim 20, wherein, for each button in a group in each said panel, the selected luminous element which emits light in the respective color is lit in said dim state upon applying said power so as to readily identify the buttons therein associated with said switching means, said input devices and said output devices.

22. A system for selectively routing signals as in claim 14, wherein each of said luminous elements is a light emitting diode.

23. A system for selectively routing signals as in claim 22, wherein each said display apparatus further includes a plurality of switching transistors.

24. A system for selectively routing signals as in claim 23, wherein each of said luminous elements contained within each of said buttons of each said panel is coupled to two of said switching transistors included in the respective display apparatus.

25. A system for selectively routing signals as in claim 24, wherein one of the two switching transistors coupled to each of said luminous elements contained within each of said buttons of each said panel is adapted to cause the respective element to emit light in said relatively dim state and the other of the two switching transistors coupled to each of said luminous elements contained within each of said buttons of each said panel is adapted to cause the respective element to emit light in said relatively bright state.

26. A system for selectively routing signals as in claim 25, wherein each said display apparatus further includes means for receiving power and wherein each of the transistors coupled to each of said luminous elements adapted to cause the respective element to emit light in said dim state in each said display means causes said respective element to emit light in said dim state upon applying said power.

27. A system for selectively routing signals as in claim 25, wherein each of the transistors coupled to each of said luminous elements adapted to cause the respective element to emit light in said relatively bright state in each said display means causes said respective element to emit light in said bright state upon activating the respective button.

28. A system for selectively routing signals as in claim 25, wherein each said display apparatus further includes control means for controlling the respective plurality of switching transistors.

29. A system for selectively routing signals as in claim 14, wherein each said display apparatus further includes first and second switching means for respectively causing each of said luminous elements contained in the buttons of the respective panel to emit light in said relatively dim state and said relatively bright state.

30. A system for selectively routing signals as in claim 29, wherein each of said first and second switching means of each said display apparatus includes a plurality of switching transistors.

31. A system for selectively routing signals as in claim 29, wherein each said display apparatus further includes control means for controlling the respective first and second switching means.

\* \* \* \* \*